US012679552B2

(12) United States Patent
Hagh

(10) Patent No.: US 12,679,552 B2
(45) Date of Patent: Jul. 14, 2026

(54) VEHICLE THERMAL MANAGEMENT SYSTEM

(71) Applicant: HONEYWELL INTERNATIONAL INC., Charlotte, NC (US)

(72) Inventor: Bijan Hagh, Newport Beach, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 147 days.

(21) Appl. No.: 18/822,923

(22) Filed: Sep. 3, 2024

(65) Prior Publication Data

US 2026/0062135 A1      Mar. 5, 2026

(51) Int. Cl.
B64D 33/08      (2006.01)

(52) U.S. Cl.
CPC .................................... B64D 33/08 (2013.01)

(58) Field of Classification Search
CPC .............................. B64D 33/08; B64D 41/007
See application file for complete search history.

(56) References Cited

U.S. PATENT DOCUMENTS

| | | | |
|---|---|---|---|
| 7,633,193 B2 | 12/2009 | Masoudipour et al. | |
| 8,495,857 B2 * | 7/2013 | Papa ....................... | F02C 7/185 |
| | | | 60/39.08 |
| 8,904,753 B2 | 12/2014 | Murphy | |
| 10,087,841 B2 | 10/2018 | Caruel | |
| 10,323,540 B2 | 6/2019 | Sennoun | |
| 11,976,595 B1 * | 5/2024 | Mohammed .............. | F02C 7/14 |
| 2013/0086909 A1 * | 4/2013 | Wang ........................ | F02C 9/36 |
| | | | 60/730 |

| | | | |
|---|---|---|---|
| 2017/0336149 A1 | 11/2017 | Ribarov et al. | |
| 2022/0403779 A1 | 12/2022 | Walz et al. | |
| 2023/0068644 A1 * | 3/2023 | Thivierge ................ | F02C 7/224 |
| 2024/0018906 A1 | 1/2024 | Yang | |

FOREIGN PATENT DOCUMENTS

| | | |
|---|---|---|
| GB | 2624095 A | 5/2024 |

OTHER PUBLICATIONS

Maria Coutinho, David Bento, Alain Souza, Rodrigo Cruz, Frederico Afonso, Fernando Lau, Afzal Suleman, Felipe R. Barbosa, Ricardo Gandolfi, Walter Affonso, Felipe I.K. Odaguil, Michelle F. Westin, Ricardo J.N. Dos Reis, Carlos R.I. Da Silva,, A review on the recent developments in thermal management systems for hybrid-electric aircraft, Jun. 5, 2023.
Van Heerden, A.S.J. , Judt, D.M. , Jafari, S. , Lawson, C.P., Nikolaidis, T. ,Bosak, D, Aircraft thermal management: practices, technology, system architectures, future challenges, and opportunities, Jan. 1, 2022.

* cited by examiner

*Primary Examiner* — Tye William Abell
(74) *Attorney, Agent, or Firm* — Ingrassia, Fisher & Lorenz LLP

(57)      ABSTRACT

A vehicle thermal management system includes a propulsion ram air duct, a propulsion fan, a first heat exchanger, and a take-off fan. The propulsion fan is disposed within the propulsion ram air duct between the ram air inlet and the ram air outlet and generates thrust. The first heat exchanger receives a portion of the flow of ram air that is drawn into the propulsion ram air duct and discharges a portion of the flow of ram air back into the propulsion ram air duct. The first heat exchanger transfers heat from lubricant to the portion of the flow of ram air. The take-off fan is disposed within the first air outlet and is selectively energized to thereby induce the portion of the flow of ram air to flow into the first air inlet duct.

20 Claims, 2 Drawing Sheets

VEHICLE THERMAL MANAGEMENT SYSTEM

TECHNICAL FIELD

The present disclosure relates to thermal management systems and more particularly to thermal management systems for vehicles.

BACKGROUND

Environmental and fuel economy goals for vehicles, such as aircraft, are becoming increasingly aggressive. Thus, improvements in various propulsion technologies are needed to meet these goals. Several non-conventional vehicle propulsion systems, such as electric propulsion systems, have been proposed and studied to meet these goals. However, heat removal from an electric propulsion system can be challenging. This, at least in part, is because, unlike conventional turbine engine propulsion systems, heat is not removed with the engine exhaust air. Moreover, the waste heat associated with electric propulsion systems can be significantly larger than existing vehicle electric systems.

Hence, there is a need for a thermal management system for non-conventional vehicle propulsion systems, such as electric propulsion systems, that removes the waste heat associated with the systems, without significantly impacting the thrust generated by the propulsion systems. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a vehicle thermal management system includes a propulsion ram air duct, a propulsion fan, a first heat exchanger, and a take-off fan. The propulsion ram air duct includes a ram air inlet and a ram air outlet. The propulsion fan is disposed within the propulsion ram air duct between the ram air inlet and the ram air outlet. The propulsion fan is adapted to receive a propulsion fan drive torque and is configured, upon receipt of the propulsion fan drive torque, to rotate and generate propulsion thrust by drawing a flow of ram air into the propulsion ram air duct, via the ram air inlet, and exhausting the flow of ram air out the propulsion ram air duct, via the ram air outlet. The first heat exchanger has a first air inlet duct, a first air outlet duct, a first lubricant inlet duct, and a first lubricant outlet duct. The first air inlet duct is in fluid communication with the propulsion ram air duct downstream of the ram air inlet to thereby receive a portion of the flow of ram air that is drawn into the propulsion ram air duct. The first air outlet duct is in fluid communication with the propulsion ram air duct downstream of the first air inlet duct and upstream of the propulsion fan to thereby discharge the portion of the flow of ram air back into the propulsion ram air duct. The first lubricant inlet duct is adapted to receive a flow of lubricant and the first lubricant outlet duct is adapted to discharge the flow of lubricant. The first heat exchanger is configured to transfer heat from the lubricant to the portion of the flow of ram air. The take-off fan is disposed within the first air outlet and is adapted to be selectively energized. The take-off fan is configured, upon being energized, to rotate and induce the portion of the flow of ram air to flow into the first air inlet duct and to be discharged out the first air outlet duct.

In another embodiment, a vehicle thermal management system includes a propulsion ram air duct, a propulsion fan, a first heat exchanger, a take-off fan, a lubrication distribution system, a first temperature sensor, a second temperature sensor, and a take-off fan controller. The propulsion ram air duct includes a ram air inlet and a ram air outlet. The propulsion fan is disposed within the propulsion ram air duct between the ram air inlet and the ram air outlet. The propulsion fan is adapted to receive a propulsion fan drive torque and is configured, upon receipt of the propulsion fan drive torque, to rotate and generate propulsion thrust by drawing a flow of ram air into the propulsion ram air duct, via the ram air inlet, and exhausting the flow of ram air out the propulsion ram air duct, via the ram air outlet. The first heat exchanger has a first air inlet duct, a first air outlet duct, a first lubricant inlet duct, and a first lubricant outlet duct. The first air inlet duct is in fluid communication with the propulsion ram air duct downstream of the ram air inlet to thereby receive a portion of the flow of ram air that is drawn into the propulsion ram air duct. The first air outlet duct is in fluid communication with the propulsion ram air duct downstream of the first air inlet duct and upstream of the propulsion fan to thereby discharge the portion of the flow of ram air back into the propulsion ram air duct. The first lubricant inlet duct is adapted to receive a flow of lubricant and the first lubricant outlet duct is adapted to discharge the flow of lubricant. The first heat exchanger is configured to transfer heat from the lubricant to the portion of the flow of ram air. The take-off fan is disposed within the first air outlet and is adapted to be selectively energized. The take-off fan is configured, upon being energized, to rotate and induce the portion of the flow of ram air to flow into the first air inlet duct and to be discharged out the first air outlet duct. The lubricant distribution system is coupled between the first lubricant inlet duct and the first lubricant outlet duct and is configured to (i) supply the flow of lubricant to a plurality of lubricant loads and to the first lubricant inlet duct and (ii) receive the flow of lubricant discharged from the first lubricant outlet duct. The first temperature sensor is mounted on the propulsion ram air duct and is configured to (i) sense ram air temperature in the propulsion ram air duct upstream of the first air inlet duct and (ii) supply a first temperature signal indicative thereof. The second temperature sensor is mounted on the propulsion ram air duct and is configured to (i) sense ram air temperature in the propulsion ram air duct downstream of the second air inlet duct and (ii) supply a second temperature signal indicative thereof. The take-off fan controller is in operable communication with the take-off fan and is coupled to receive the first temperature signal and the second temperature signal. The take-off fan controller is configured to process first and second temperature signals and, based on the first and second temperature signals, to selectively energize and de-energize the take-off fan, and vary a rotational speed of the take-off fan when the take-off fan is energized.

Furthermore, other desirable features and characteristics of the vehicle thermal management system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
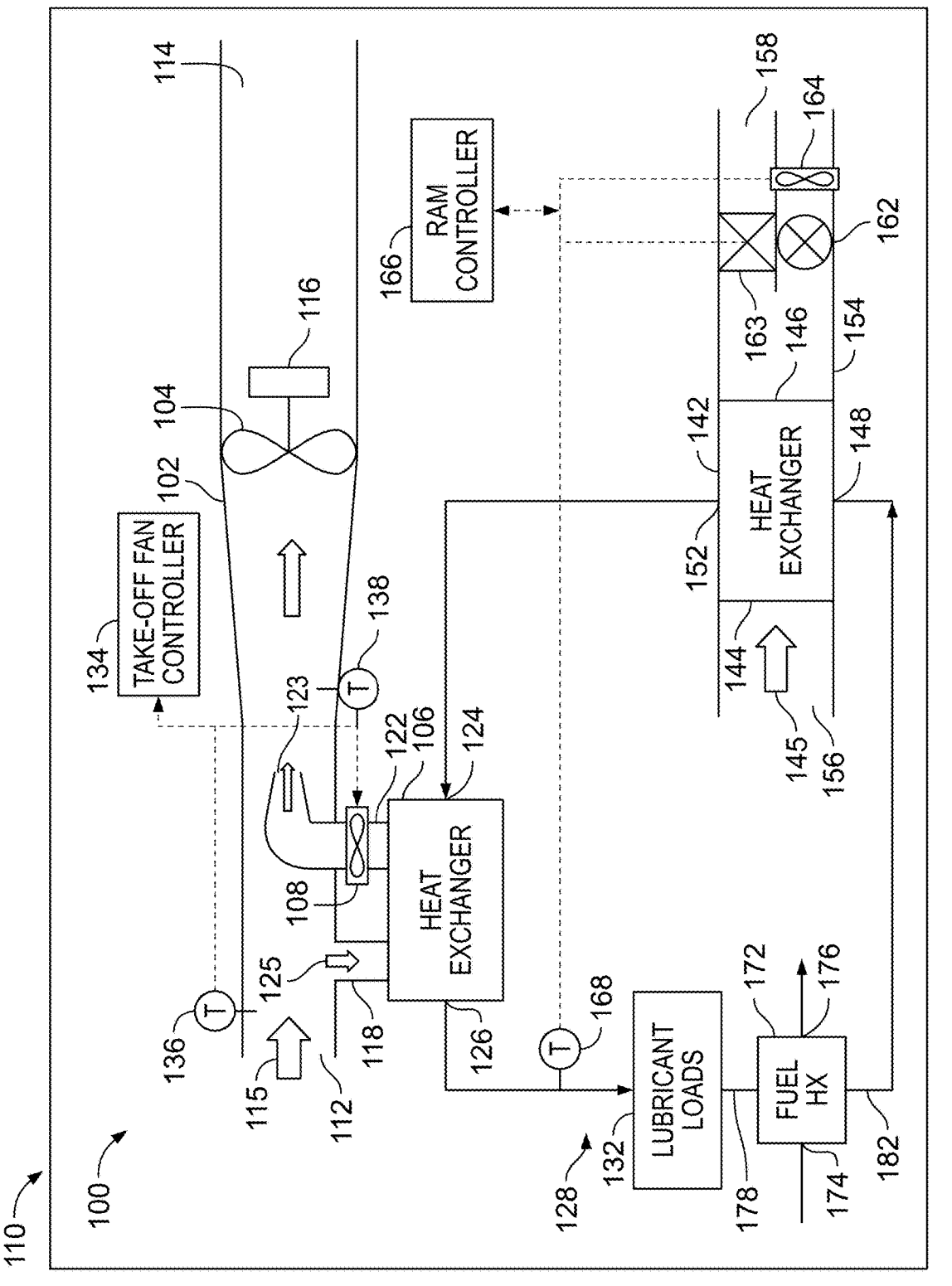
FIG. 1 depicts a functional schematic diagram of one example embodiment of a vehicle thermal management system.

Referring first to FIG. 1, a functional schematic diagram of one embodiment of a vehicle thermal management system 100 is depicted. The depicted thermal management system 100 includes a propulsion ram air duct 102, a propulsion fan 104, a first heat exchanger 106, and a take-off fan 108, and is disposed on or within a vehicle 110. Before describing the thermal management system 100 in more detail, it should be noted that the vehicle 110 may be any one of numerous types of vehicles, including various types of aerial vehicles, water vehicles, terrestrial vehicles, or space vehicles. In one particular embodiment, however, the vehicle 110 is an aerial vehicle.

Turning now to the thermal management system 100, it is seen that the propulsion ram air duct 102 includes a ram air inlet 112 and a ram air outlet 114, and the propulsion fan 104 is disposed within the propulsion ram air duct 102 between the ram air inlet 112 and the ram air outlet 114. The propulsion fan 104 is coupled to receive a propulsion fan drive torque, from a drive torque source 116, and is configured, upon receipt of the propulsion fan drive torque, to rotate and generate propulsion thrust by drawing a flow of ram air 115 into the propulsion ram air duct 102, via the ram air inlet 112, and exhausting the flow of ram air 115 out the propulsion ram air duct 102, via the ram air outlet 114.

It will be appreciated that the propulsion fan drive torque source 116 may be implemented using any one of numerous devices that are configured to supply a drive torque. For example, it may be implemented using an electric motor, a turbogenerator, a gas turbine engine, a combustion engine, or a diesel engine, just to name a few. In a particular preferred embodiment, the propulsion fan drive torque source 116 is implemented using an electric motor.

No matter the specific type of propulsion fan drive torque source 116, the first heat exchanger includes a first air inlet duct 118, a first air outlet duct 122, a first lubricant inlet duct 124, and a first lubricant outlet duct 126. The first air inlet duct 118 is in fluid communication with the propulsion ram air duct 102 downstream of the ram air inlet 112. The first air inlet duct 118 thus receives a portion 125 of the flow of ram air that is drawn into the propulsion ram air duct 102. The first air outlet duct 122 is in fluid communication with the propulsion ram air duct 102 downstream of the first air inlet duct 118 and upstream of the propulsion fan 104. Thus, the first air outlet duct 122 discharges the portion 125 of the flow of ram air back into the propulsion ram air duct 102. As depicted in FIG. 1, the first air outlet duct 122 includes a first air outlet discharge opening 123 that has a cross-sectional shape that increases the flow speed of the portion of the ram air discharged out the first air outlet duct 122. This is done to help recover at least a portion of the thrust that is lost when the portion 125 of the ram air is directed into and through the first heat exchanger 106.

The first lubricant inlet duct 124 is coupled to receive a flow of lubricant and the first lubricant outlet duct 126 discharges the flow of lubricant. More specifically, and as FIG. 1 further depicts, the thermal management system 100, at least in the depicted embodiment, additionally includes a lubricant distribution system 128, which is coupled between the first lubricant inlet duct 124 and the first lubricant outlet duct 126. The lubricant distribution system 128 is configured to supply the flow of lubricant at least to a plurality of lubricant loads 132 and to the first lubricant inlet duct 124, and to receive the flow of lubricant discharged from the first lubricant outlet duct 126.

It will be appreciated that the first heat exchanger 106 may be implemented using any one of numerous types of heat exchanger configurations. For example, it may be configured as a concurrent flow heat exchanger, a countercurrent flow heat exchanger, or a crossflow heat exchanger. Regardless of the specific configuration, the first heat exchanger 106 is configured to transfer heat from the lubricant to the portion 125 of the flow of ram air.

The take-off fan 108 is disposed within the first air outlet duct 122 and is configured to be selectively electrically energized. The take-off fan 108, upon being electrically energized, rotates and induces the portion 125 of the flow of ram air to flow into the first air inlet duct 118 and to be discharged out the first air outlet duct 122. It will be appreciated that the take-off fan 108 may be selectively energized either manually, via a manual switch, or automatically, via a controller. As shown in FIG. 1, in the depicted embodiment, the take-off fan 108 is selectively energized via a controller-referred to herein as a take-off fan controller 134.

More specifically, the take-off fan controller 134, when included, is in operable communication with the take-off fan 108 and is configured to selectively energize the take-off fan 108 based on a plurality of sensed temperatures. To do so, the depicted system 100 additionally includes a first temperature sensor 136 and a second temperature sensor 138. The first temperature sensor 136 mounted on the propulsion ram air duct 102 and is configured to sense ram air temperature in the propulsion ram air duct 102 upstream of the first air inlet duct 118 and to supply a first temperature signal indicative thereof to the take-off fan controller 134. The second temperature sensor 138 is also mounted on the propulsion ram air duct 102, but downstream of the first air outlet duct 122. The second temperature sensor 138 is configured to sense ram air temperature in the propulsion ram air duct 102 downstream of the first air outlet duct 122 and to supply a second temperature signal indicative thereof to the take-off fan controller 134. The take-off fan controller 134 receives and processes the first and second temperature signals and is configured, based on the first and second temperature signals, to selectively energize and de-energize the take-off fan 108 and to vary the rotational speed of the take-off fan 108 when the take-off fan 108 is energized.

The system 100 depicted in FIG. 1 may additionally include a second heat exchanger 142. The second heat exchanger 142, when included, is disposed in flow series, with respect to lubricant flow, with the first heat exchanger

106. More specifically, the second heat exchanger 142 includes a second air inlet duct 144, a second air outlet duct 146, a second lubricant inlet duct 148, and a second lubricant outlet duct 152. The second air inlet duct 144 receives a second flow of ram air 145 and the second air outlet duct 146 is configured to discharge the second flow of ram air 145. The second lubricant inlet duct 148 is coupled to receive the flow of lubricant from the lubricant distribution system 128 and the second lubricant outlet duct 152 is in fluid communication with the first lubricant inlet duct 124. Thus, the flow of lubricant to the first lubricant inlet duct 124 is supplied via the second lubricant outlet duct 152. It will be appreciated that the first flow of ram air 115 and the second flow of ram air 145 may be supplied from the same opening in the vehicle 110.

As with the first heat exchanger 106, the second heat exchanger 142 may be implemented using any one of numerous types of heat exchanger configurations. For example, it may be configured as a concurrent flow heat exchanger, a countercurrent flow heat exchanger, or a cross-flow heat exchanger. It will be appreciated that the second heat exchanger 142 may be configured as a surface cooler in the propulsion ram air duct 102. Regardless of the specific configuration, the second heat exchanger 142 is configured to transfer heat from the lubricant to the second flow of ram air 145.

As FIG. 1 depicts, the second flow of ram air 145 is supplied to the second heat exchanger 142 via a second ram air duct 154. The second ram air duct 154 has a second ram air inlet 156 and a second ram air outlet 158, and the second heat exchanger 142 is disposed within the second ram air duct 154. In addition to the second heat exchanger 142, some additional components may also be disposed within the second ram air duct 154. The additional components include a shut-off valve 162, a sealing modulating valve 163, and a ground fan 164.

The shut-off valve 162, when included, is disposed downstream of the second air outlet duct 146 and upstream of ground fan 164. The shut-off valve 162 and the sealing modulating valve 163 are both moveable between a closed position and one or more open positions. When the shut-off valve 162 is in the closed position, all of the second flow of ram air 145 flows into and through the sealing modulating valve 163 and out the second ram air outlet 158. Conversely, when the shut-off valve 162 is in the open position, and depending upon the position of the sealing modulating valve 163, some or all of the second flow of ram air 145 can flow to the ground fan 164 and out the second ram air outlet 158. More specifically, when the sealing modulating valve 163 is in a closed position, all of the second flow of ram air 145 can flow to the ground fan 164 and out the second air ram air outlet 158, and when the sealing modulating valve 163 is in an open position, only a portion of the second flow of ram air 145 can flow to the ground fan 164 and out the second air ram air outlet 158. The remainder flows into and through the sealing modulating valve 163.

The sealing modulating valve 163 is disposed parallel in the air flow to the shut-off valve 162 and is configured to be selectively electrically energized. The sealing modulating valve 163 is preferably energized when the vehicle is moving at a relatively high speed and is configured, upon being electrically energized, to rotate and modulate the second flow of ram air 145 to flow into and through the second heat exchanger 142. It will be appreciated that the sealing modulating valve 163 may be selectively energized, either manually, via a manual switch, or automatically, via a controller, such as the ram controller 166 that is described below.

The ground fan 164 is disposed downstream of the shut-off valve 162 and is configured to be selectively electrically energized. The ground fan 164 is preferably energized when the vehicle is not moving (or moving at a relatively low speed) and is configured, upon being electrically energized, to rotate and induce the second flow of ram air 145 to flow into and through the second heat exchanger 142. It will be appreciated that shut-off valve 162 may be positioned, and the ground fan 164 may be selectively energized, either manually, via a manual switch, or automatically, via a controller. As shown in FIG. 1, in the depicted embodiment, the shut-off valve 162, the sealing modulating valve 163, and ground fan 164 are controlled via a controller-referred to herein as a ram controller 166.

More specifically, the ram controller 166, when included, is in operable communication with the ground fan 164 and the sealing modulating valve 163. The ram controller 166 is configured to selectively energize the ground fan 164 and/or the sealing modulating valve 163 based on a sensed lubricant temperature. To do so, the depicted system 100 additionally includes a lubricant temperature sensor 168. The lubricant temperature sensor 168 is mounted on the first lubricant outlet duct 126 and is configured to sense lubricant temperature in the first lubricant outlet duct 126 and supply a lubricant temperature signal indicative thereof to the ram controller 166. The ram controller 166 receives and processes the lubricant temperature signal and is configured, based on the lubricant temperature signal, to selectively open and close the shut-off valve 162, to selectively energize and de-energize the ground fan 164, and to selectively modulate the sealing modulating valve 163. The ram controller 166 may also vary the rotational speed of the ground fan 164 when the ground fan 164 is energized.

As was noted above, the propulsion fan drive torque source 116 may be implemented using any one of numerous electric or fuel-powered devices. When implemented using a fuel-powered device, the system 100, as depicted in FIG. 1, may additionally include a fuel heat exchanger 172. When included, the fuel heat exchanger 172 has a fuel inlet duct 174, a fuel outlet duct 176, a third lubricant inlet duct 178, and a third lubricant outlet duct 182. The fuel inlet duct 174 receives a flow of fuel from a non-illustrated fuel supply source and the fuel outlet duct 176 discharges the flow of fuel. The third lubricant inlet duct 178 is coupled to receive the flow of lubricant from the lubricant distribution system 128 and the third lubricant outlet duct 182 is in fluid communication with the second lubricant inlet duct 148 to thereby supply the flow of lubricant to the second lubricant inlet duct 148.

Similar to the first and second heat exchangers 106, 142, the fuel heat exchanger 172 may be implemented using any one of numerous types of heat exchanger configurations. For example, it may be configured as a concurrent flow heat exchanger, a countercurrent flow heat exchanger, or a cross-flow heat exchanger. Regardless of the specific configuration, the fuel heat exchanger 172 is configured to transfer heat from the lubricant to the fuel.

Figure 2:
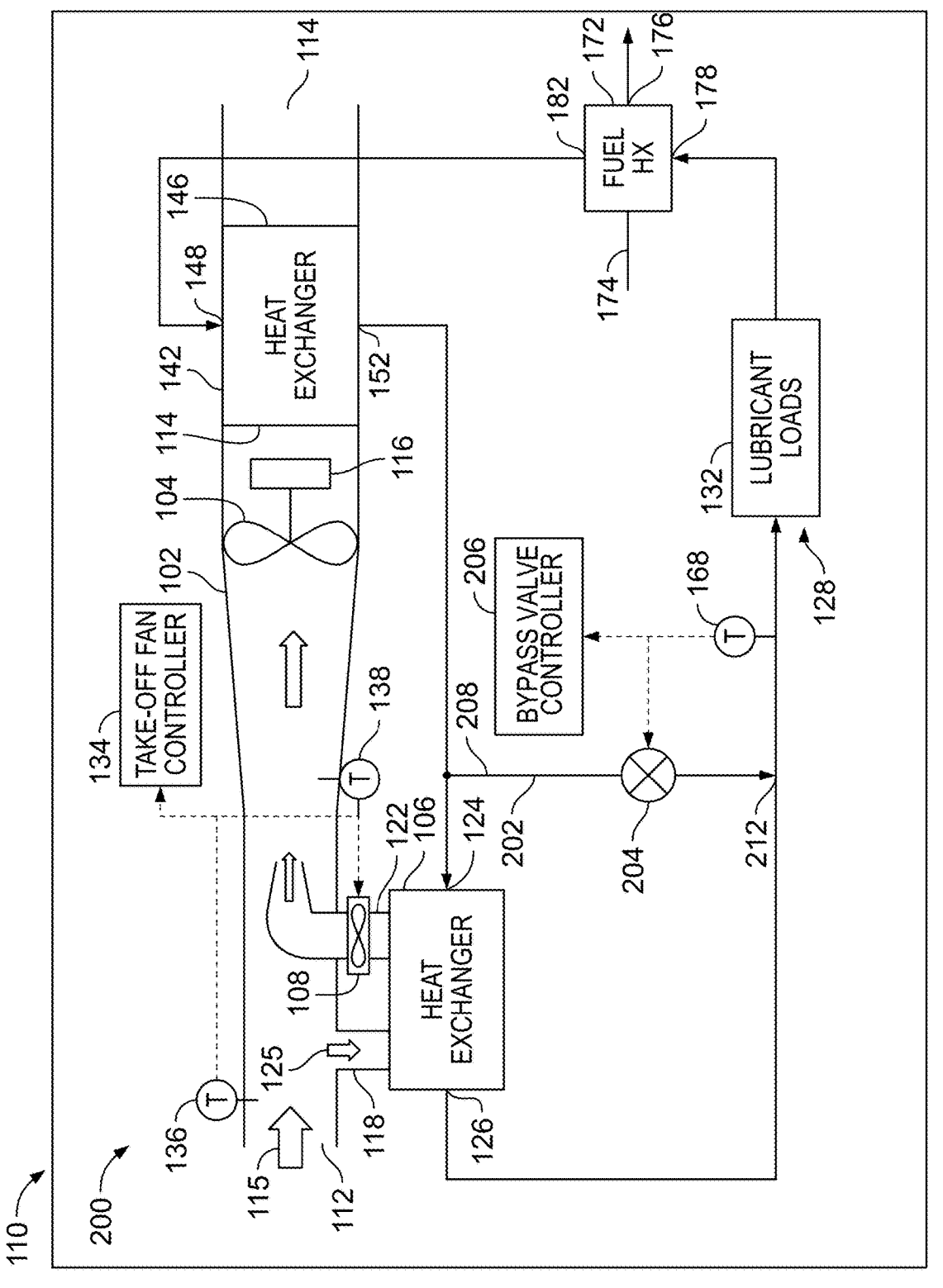
FIG. 2 depicts a functional schematic diagram of another example embodiment of a vehicle thermal management system.

Referring now to FIG. 2, a functional schematic diagram of another example embodiment of a vehicle thermal management system is depicted and will be described. Before doing so, however, it is noted that the system 200 depicted in FIG. 2 includes many of the same devices, components, and systems as the system 100 of FIG. 1. For ease in describing the system 200 of FIG. 2, the devices, components, and systems that are common in the two systems 100, 200 will be labeled using the same reference numerals and detailed descriptions of these devices, components, and systems will, for the most part, not be repeated.

Turning now to the description of the system 200 of FIG. 2, it is seen that one of the differences with this system 200 is that the second heat exchanger 142 is not disposed in a second ram air duct 154. Rather, it is disposed within the propulsion ram air duct 102. More specifically, it is disposed in the propulsion ram air duct 102 downstream of the propulsion fan 104. Thus, the second air inlet duct 144 is coupled to receive the flow of ram air 115 from the propulsion fan 104, and the second air outlet duct 146 is configured to discharge the flow of ram air 115 toward the ram air outlet 114. Moreover, in this embodiment, the second heat exchanger 142 transfers heat from the lubricant to the flow of ram air 115.

Another difference between the two systems 100, 200, is that the system 200 depicted in FIG. 2 does not include the shut-off valve 162, the sealing modulating valve 163, the ground fan 164, and the ram controller 166. However, this system 200 does include a lubricant bypass duct 202, a bypass valve 204, and a bypass valve controller 206. The lubricant bypass duct 202 has a bypass duct inlet 208 and a bypass duct outlet 212. The bypass duct inlet 208 is in fluid communication with first lubricant inlet duct 124 and the second lubricant outlet duct 152, and the bypass duct outlet 212 is in fluid communication with the first lubricant outlet duct 126.

The bypass valve 204, which may be implemented using any one of numerous known valve types, is mounted on the lubricant bypass duct 202 between the bypass duct inlet 208 and the bypass duct outlet 212. The bypass valve 204 is movable between a closed position and an open position. In the closed position, the lubricant cannot flow into and through the lubricant bypass duct 202. In the open position, the lubricant can flow into and through the lubricant bypass duct 202.

As with the system 100 depicted in FIG. 1, the lubricant temperature sensor 168 is mounted on the first lubricant outlet duct 126 and supplies a lubricant temperature signal. However, in the system 200 of FIG. 2, the lubricant temperature signal is supplied to the bypass valve controller 206. The bypass valve controller 206, which is in operable communication with the bypass valve 204, is configured to process the lubricant temperature signal and, based on the lubricant temperature signal, to selectively open and close the bypass valve 204.

Those of skill in the art will appreciate that the various illustrative logical blocks, modules, circuits, and algorithm steps described in connection with the embodiments disclosed herein may be implemented as electronic hardware, computer software, or combinations of both. Those of skill in the art will additionally appreciate that the functionality of the take-off fan controller 134 and the ram controller 166 depicted in FIG. 1 may be implemented in a single device or separate devices. Similarly, the functionality of the take-off fan controller 134 and the bypass valve controller 206 depicted in FIG. 2 may be implemented in a single device or separate devices.

The thermal management systems 100, 200 described herein remove waste heat associated with non-conventional propulsion systems, without significantly impacting the thrust generated by the propulsion systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The invention claimed is:

1. A vehicle thermal management system, comprising:

a propulsion ram air duct including a ram air inlet and a ram air outlet;

a propulsion fan disposed within the propulsion ram air duct between the ram air inlet and the ram air outlet, the propulsion fan adapted to receive a propulsion fan drive torque and configured, upon receipt of the propulsion fan drive torque, to rotate and generate propulsion thrust by drawing a flow of ram air into the propulsion ram air duct, via the ram air inlet, and exhausting the flow of ram air out the propulsion ram air duct, via the ram air outlet;

a first heat exchanger having a first air inlet duct, a first air outlet duct, a first lubricant inlet duct, and a first lubricant outlet duct, the first air inlet duct in fluid communication with the propulsion ram air duct downstream of the ram air inlet to thereby receive a portion of the flow of ram air that is drawn into the propulsion ram air duct, the first air outlet duct in fluid communication with the propulsion ram air duct downstream of the first air inlet duct and upstream of the propulsion fan to thereby discharge the portion of the flow of ram air back into the propulsion ram air duct, the first lubricant inlet duct adapted to receive a flow of lubricant, the first lubricant outlet duct adapted to discharge the flow of lubricant, the first heat exchanger configured to transfer heat from the lubricant to the portion of the flow of ram air; and a take-off fan disposed within the first air outlet and adapted to be selectively energized, the take-off fan configured, upon being energized, to rotate and induce the portion of the flow of ram air to flow into the first air inlet duct and to be discharged out the first air outlet duct.

2. The system of claim 1, wherein:

the first air outlet duct includes a first air outlet duct inlet opening and a first air outlet duct discharge opening; and the first air outlet discharge opening having a cross-sectional shape that increases a flow speed of the portion of the ram air discharged out the first air outlet duct.

3. The system of claim 1, further comprising:

a first temperature sensor mounted on the propulsion ram air duct and configured to (i) sense ram air temperature in the propulsion ram air duct upstream of the first air inlet duct and (ii) supply a first temperature signal indicative thereof;

a second temperature sensor mounted on the propulsion ram air duct and configured to (i) sense ram air temperature in the propulsion ram air duct downstream of the second air inlet duct and (ii) supply a second temperature signal indicative thereof; and a take-off fan controller in operable communication with the take-off fan and coupled to receive the first temperature signal and the second temperature signal, the take-off fan controller configured to process first and second temperature signals and, based on the first and second temperature signals, to:

selectively energize and de-energize the take-off fan, and vary a rotational speed of the take-off fan when the take-off fan is energized.

4. The system of claim 1, further comprising:

a lubricant distribution system coupled between the first lubricant inlet duct and the first lubricant outlet duct, the lubricant distribution system configured to (i) supply the flow of lubricant to a plurality of lubricant loads and to the first lubricant inlet duct and (ii) receive the flow of lubricant discharged from the first lubricant outlet duct.

5. The system of claim 4, further comprising:

a second heat exchanger disposed within the propulsion ram air duct downstream of the propulsion fan, the second heat exchanger having a second air inlet duct, a second air outlet duct, a second lubricant inlet duct, and a second lubricant outlet duct, the second air inlet duct coupled to receive the flow of ram air from the propulsion fan, the second air outlet duct configured to discharge the flow of ram air toward the ram air outlet, the second lubricant inlet duct coupled to receive the flow of lubricant from the lubricant distribution system, the second lubricant outlet duct in fluid communication with the first lubricant inlet duct to thereby supply the flow of lubricant to the first lubricant inlet duct, the second heat exchanger configured to transfer heat from the lubricant to the second flow of ram air.

6. The system of claim 5, further comprising:

a lubricant bypass duct having a bypass duct inlet and a bypass duct outlet, the bypass duct inlet in fluid communication with first lubricant inlet duct, the bypass duct outlet in fluid communication with the first lubricant outlet duct; and a bypass valve mounted on the lubricant bypass duct between the bypass duct inlet and the bypass duct outlet, the bypass valve movable between a closed position, in which the lubricant cannot flow into and through the lubricant bypass duct, and an open position, in which the lubricant can flow into and through the lubricant bypass duct.

7. The system of claim 6, further comprising:

a first temperature sensor mounted on the propulsion ram air duct and configured to (i) sense ram air temperature in the propulsion ram air duct upstream of the first air inlet duct and (ii) supply a first temperature signal indicative thereof;

a second temperature sensor mounted on the propulsion ram air duct and configured to (i) sense ram air temperature in the propulsion ram air duct downstream of the second air inlet duct and (ii) supply a second temperature signal indicative thereof; and a take-off fan controller in operable communication with the take-off fan and coupled to receive the first temperature signal and the second temperature signal, the take-off fan controller configured to process first and second temperature signals and, based on the first and second temperature signals, to:

selectively energize and de-energize the take-off fan, and vary a rotational speed of the take-off fan when the take-off fan is energized.

8. The system of claim 7, further comprising:

a lubricant temperature sensor mounted on the second lubricant outlet duct and configured to (i) sense lubricant temperature in the second lubricant outlet duct and (ii) supply a lubricant temperature signal indicative thereof; and a bypass valve controller in operable communication with the bypass valve and coupled to receive the lubricant temperature signal, the valve controller configured to process the lubricant temperature signal and, based on the lubricant temperature signal, to selectively open and close the bypass valve.

9. The system of claim 4, further comprising:

a second heat exchanger having a second air inlet duct, a second air outlet duct, a second lubricant inlet duct, and a second lubricant outlet duct, the second air inlet duct adapted to receive a second flow of ram air, the second air outlet duct configured to discharge the second flow of ram, the second lubricant inlet duct coupled to receive the flow of lubricant from the lubricant distribution system, the second lubricant outlet duct in fluid communication with the first lubricant inlet duct to thereby supply the flow of lubricant to the first lubricant inlet duct, the second heat exchanger configured to transfer heat from the lubricant to the second flow of ram air.

10. The system of claim 9, further comprising:

a fuel heat exchanger having a fuel inlet duct, a fuel outlet duct, a third lubricant inlet duct, and a third lubricant outlet duct, the fuel inlet duct adapted to receive a flow of fuel from a fuel supply source, the fuel outlet duct configured to discharge the flow of fuel, the third lubricant inlet duct coupled to receive the flow of lubricant from the lubricant distribution system, the third lubricant outlet duct in fluid communication with the second lubricant inlet duct to thereby supply the flow of lubricant to the second lubricant inlet duct, the fuel heat exchanger configured to transfer heat from the lubricant to the fuel.

11. The system of claim 9, further comprising:

a sealing modulating valve disposed downstream of the second air outlet duct and movable between a modulating valve closed position and a plurality of modulating valve open positions;

a shut-off valve disposed downstream of the second air outlet duct and in flow-parallel to the sealing modulating valve, the shut-off valve movable between a shut-off valve closed position, in which all of the second flow of ram air can, when the sealing modulating valve is in one of the plurality of modulating valve open positions, flow into and through the sealing modulating valve and out the second ram air outlet, and a shut-off valve open position, in which some or all of the second flow of ram air can flow to the ground fan and out the second ram air outlet depending on the sealing modulating valve position; and a ground fan disposed downstream of the shut-off valve.

12. The system of claim 11, further comprising:

a lubricant temperature sensor mounted on the second lubricant outlet duct and configured to (i) sense lubricant temperature in the second lubricant outlet duct and (ii) supply a lubricant temperature signal indicative thereof; and a ram controller in operable communication with the ground fan, the sealing modulating valve and the shut-off valve and coupled to receive the lubricant temperature signal, the ram controller configured to process the lubricant temperature signals and, based on the lubricant temperature signal, to:

selectively open and close the shut-off valve, selectively modulate the sealing modulating valve, selectively energize and de-energize the ground fan, and vary a rotational speed of the ground fan when ground fan is energized.

13. The system of claim 11, wherein:

the system further comprises a second ram air duct having a second ram air inlet and a second ram air outlet; and the second heat exchanger is disposed within the second ram air duct.

14. The system of claim 13, wherein the shut-off valve and the ground fan are both disposed within the second ram air duct.

15. A vehicle thermal management system, comprising:

a propulsion ram air duct including a ram air inlet and a ram air outlet;

a propulsion fan disposed within the propulsion ram air duct between the ram air inlet and the ram air outlet, the propulsion fan adapted to receive a propulsion fan drive torque and configured, upon receipt of the propulsion fan drive torque, to rotate and generate propulsion thrust by drawing a flow of ram air into the propulsion ram air duct, via the ram air inlet, and exhausting the flow of ram air out the propulsion ram air duct, via the ram air outlet;

a first heat exchanger having a first air inlet duct, a first air outlet duct, a first lubricant inlet duct, and a first lubricant outlet duct, the first air inlet duct in fluid communication with the propulsion ram air duct downstream of the ram air inlet to thereby receive a portion of the flow of ram air that is drawn into the propulsion ram air duct, the first air outlet duct in fluid communication with the propulsion ram air duct downstream of the first air inlet duct and upstream of the propulsion fan to thereby discharge the portion of the flow of ram air back into the propulsion ram air duct, the first lubricant inlet duct adapted to receive a flow of lubricant, the first lubricant outlet duct adapted to discharge the flow of lubricant, the first heat exchanger configured to transfer heat from the lubricant to the portion of the flow of ram air;

a take-off fan disposed within the first air outlet and adapted to be selectively energized, the take-off fan configured, upon being energized, to rotate and induce the portion of the flow of ram air to flow into the first air inlet duct and to be discharged out the first air outlet duct;

a lubricant distribution system coupled between the first lubricant inlet duct and the first lubricant outlet duct, the lubricant distribution system configured to (i) supply the flow of lubricant to a plurality of lubricant loads and to the first lubricant inlet duct and (ii) receive the flow of lubricant discharged from the first lubricant outlet duct;

a first temperature sensor mounted on the propulsion ram air duct and configured to (i) sense ram air temperature in the propulsion ram air duct upstream of the first air inlet duct and (ii) supply a first temperature signal indicative thereof;

a second temperature sensor mounted on the propulsion ram air duct and configured to (i) sense ram air temperature in the propulsion ram air duct downstream of the second air inlet duct and (ii) supply a second temperature signal indicative thereof; and a take-off fan controller in operable communication with the take-off fan and coupled to receive the first temperature signal and the second temperature signal, the take-off fan controller configured to process first and second temperature signals and, based on the first and second temperature signals, to:

selectively energize and de-energize the take-off fan, and vary a rotational speed of the take-off fan when the take-off fan is energized.

16. The system of claim 15, further comprising:

a second heat exchanger having a second air inlet duct, a second air outlet duct, a second lubricant inlet duct, and a second lubricant outlet duct, the second air inlet duct adapted to receive a second flow of ram air, the second air outlet duct configured to discharge the second flow of ram, the second lubricant inlet duct coupled to receive the flow of lubricant from the lubricant distribution system, the second lubricant outlet duct in fluid communication with the first lubricant inlet duct to thereby supply the flow of lubricant to the first lubricant inlet duct, the second heat exchanger configured to transfer heat from the lubricant to the second flow of ram air.

17. The system of claim 16, further comprising:

a fuel heat exchanger having a fuel inlet duct, a fuel outlet duct, a third lubricant inlet duct, and a third lubricant outlet duct, the fuel inlet duct adapted to receive a flow of fuel from a fuel supply source, the fuel outlet duct configured to discharge the flow of fuel, the third lubricant inlet duct coupled to receive the flow of lubricant from the lubricant distribution system, the third lubricant outlet duct in fluid communication with the second lubricant inlet duct to thereby supply the flow of lubricant to the second lubricant inlet duct, the fuel heat exchanger configured to transfer heat from the lubricant to the fuel.

18. The system of claim 16, further comprising:

a sealing modulating valve disposed downstream of the second air outlet duct and movable between a modulating valve closed position and a plurality of modulating valve open positions;

a shut-off valve disposed downstream of the second air outlet duct and in flow-parallel to the sealing modulating valve, the shut-off valve movable between a shut-off valve closed position, in which all of the second flow of ram air can, when the sealing modulating valve is in one of the plurality of modulating valve open positions, flow into and through the sealing modulating valve and out the second ram air outlet, and a shut-off valve open position, in which some or all of the second flow of ram air can flow to the ground fan and out the second ram air outlet depending on the sealing modulating valve position; and a ground fan disposed downstream of the shut-off valve.

19. The system of claim 18, further comprising:

a lubricant temperature sensor mounted on the second lubricant outlet duct and configured to (i) sense lubricant temperature in the second lubricant outlet duct and (ii) supply a lubricant temperature signal indicative thereof; and a ram controller in operable communication with the ground fan, the sealing modulating valve, and the shut-off valve and coupled to receive the lubricant temperature signal, the ram controller configured to process the lubricant temperature signals and, based on the lubricant temperature signal, to:

selectively open and close the shut-off valve, selectively modulate the sealing modulating valve, selectively energize and de-energize the ground fan, and vary a rotational speed of the ground fan when ground fan is energized.

20. The system of claim 18, wherein:

the system further comprises a second ram air duct having a second ram air inlet and a second ram air outlet;

the second heat exchanger is disposed within the second ram air duct; and the shut-off valve and the ground fan are both disposed within the second ram air duct downstream of the second heat exchanger.

* * * * *